Feb. 28, 1950     C. E. HOLLYDAY, JR     2,499,024
TUBE FITTING
Filed Oct. 13, 1944

*INVENTOR.*
Charles E. Hollyday Jr.
BY
Donald W. Farrington
ATTORNEY

Patented Feb. 28, 1950

2,499,024

UNITED STATES PATENT OFFICE 2,499,024

TUBE FITTING

Charles E. Hollyday, Jr., Baltimore, Md., assignor to The Glenn L. Martin Company, Middle River, Md., a corporation of Maryland Application October 13, 1944, Serial No. 558,564

1 Claim. (Cl. 285—163)

My invention relates to a tube coupling or fitting, and more particularly to a high pressure connection for metal tubes or pipes.

One of the principal problems involved in working with high pressure tubes and fittings is the forming of secure fluid tight connections that may be effected without special tools and which may be handled by relatively unskilled workmen.

Among the prior art tube and pipe joints are those in which the tube is threaded, flared or beaded prior to assembly with the fitting; and those where the tube is not shaped prior to assembly in the fitting, but where the fitting includes metal chucks or the like which bite into the metal of the tube or friction devices are provided to frictionally hold the tube when the fitting is assembled. There are certain defects characteristic of both types of joints. One disadvantage present in the first group is that special tools are required. Good flares or beads may be formed in the shop where elaborate equipment is available, but field tools or service tools are such that they stress the metal beyond safe limits and develop cracks resulting in failure in use. A further disadvantage generally found is that the nut cannot be slipped on and off without destroying the flare or bead; thus if a nut or gasket requires replacement it is necessary to destroy the pre-formed flare or bead. Not only does this necessitate shortening the tube—which is frequently required to be of a specific length—but it also requires further shop or special tool work to form a new flare or bead.

Among the defects present in the second group is that the user must be highly skilled to properly assemble the fitting. In such devices the tightening of the nut is critical, for one extra turn may cause the metal chuck or gripping element in the fitting to bite clear through the tube. Since this fault is internal it cannot be observed by the user at the time of the assembly, and the joint will fail in use. When such a fitting develops a slight leak service men naturally give the nut additional turns and thereby utterly destroy the joint. Another disadvantage inherent in such devices is that they cannot be reused. The part that cuts into the tool to hold it permanently defaces the tube, and it is impossible to disassemble and reassemble the parts in exactly the same relationship. The metal-to-metal type fitting is not adapted to effect a fluid tight seal, such as may be obtainable only with a resilient gasket. Nor will the friction type of fitting withstand high pressures such as are desired in modern hydraulic design. It is also found that such prior art types of fitting are unsuited to withstand vibrations.

It is among the objects of my invention to provide a tube coupling or fitting wherein a part of the fitting works the metal of the tube into a re-entrant bead reducing the internal diameter of the tube during its assembly with the fitting.

It is a further object of my invention to provide a tube fitting according to the preceding object wherein the fitting part that forms the bead is a deformable sealing gasket.

Another object of my invention is to provide a tube fitting according to the preceding objects wherein the gasket interlocks the tube and fitting to establish a fluid pressure seal and to prevent withdrawal of the tube from the fitting.

A further object of my invention is to provide a tube fitting according to the first above object wherein the metal working of the tube is effected by turning a threaded nut which has an internal diameter greater than the diameter of the tube after being worked whereby the nut may be readily slipped on and off the tube to facilitate quick disassembly and reassembly of the fitting.

Another object of my invention is to provide a tube fitting according to the preceding objects wherein the nut may safely be bottomed without adversely affecting the joint between the tube and fitting.

It is a further object of my invention to provide a flareless tube fitting comprising a seal gland or fitting adapted to receive a tube, resilient seal means adapted to be placed about the tube within the gland, pressure means adapted to compress and reduce the diameter of the seal means, whereby it is forced against and beads said tube and wherein means are provided limiting the amount of pressure applied to said seal so that the size of the bead in the tube may be limited.

All these and other objects and accomplishments of my invention will be explained in the following detailed description, and in the drawings wherein.

Briefly, the foregoing objects of my invention are achieved by a tube-to-fitting connection comprising a seal gland or fitting axially bored to receive a tube, the fitting body being formed at one end with a chamber adjoining the bore co-axial with the bore, an annular washer adapted to fit inside the chamber, a gland nut adapted to be threaded within the chamber to move the washer axially and thereby to compress and radially contract the seal, uniformly gripping the tube and forming an internal bead in the tube so that the tube is rigidly secured to the fitting.

Figure 1:
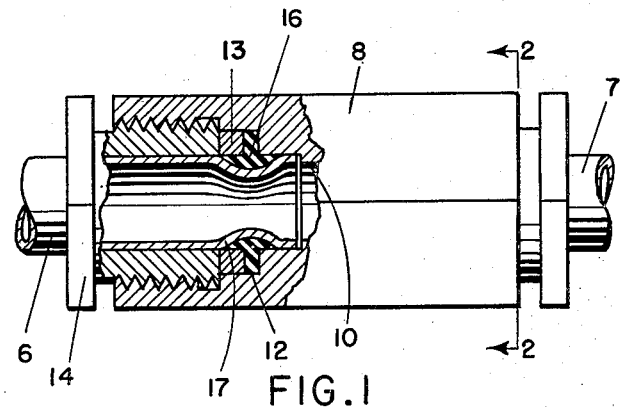
Figure 1 is a view of my tube fitting with a portion of the seal gland cut away to show the interior construction.
Figure 2:
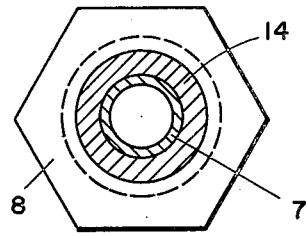
Fig. 2 is a cross section of the seal gland and tube taken on plane 2—2 of Fig. 1.
Figure 3:
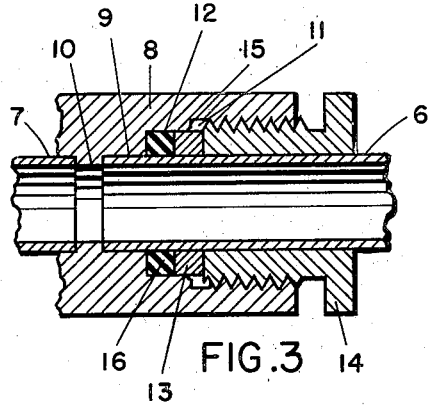
Fig. 3 is a cross section showing the construction of my fitting prior to the application of beading pressure.

Referring to the drawings, a cylindrical metal tube 6 made of material such as aluminum or steel or the like which is to be coupled to another tube 7, or secured to a fitting, is inserted into a fitting or seal gland 8 which I have here shown as part of a coupling uniting a pair of tubes 6 and 7 (see Fig. 3). The fitting or seal gland 8 is formed with an axial bore 9 adapted snugly to receive one end of the tube 6, and shoulder 10 extends interiorly of the bore to serve a measure of the extent of the tube 6 into the fitting and to align adjoining tubes 6 and 7. One end of the seal gland 8 is formed with a threaded socket 11 which is reduced in diameter at its inner end to provide a slightly smaller socket 12, both of which are co-axial with the bore 9. The interior socket 12 is adapted to receive a washer 13 of metal or the like which has an axial extent exceeded by the axial extent of the inner socket 12. The socket 11 is adapted to receive the correspondingly threaded portion of a gland nut 14 which is arranged to abut against the washer 13 and to subsequently bottom against shoulder 15 at the juncture of sockets 11 and 12.

To form my tube fitting I first place a seal ring 16, formed preferably of resilient material such as rubber, synthetic rubber, or the like, into the inner socket 12. Immediately adjacent the seal ring I place the washer 13. I then insert the free end of the tube 6 through the bore of the gland nut 14 and insert the free end of the tube 6 into the bore of the seal gland 8 and thereafter screw the gland nut 14 into the threaded socket 11. As the gland nut is turned into the socket 11 of the seal gland or fitting 8 it forces the compression washer 13 into the inner socket 12. The compression washer thereupon forces the seal 16 to bear tightly against the inner wall of the seal gland and against the outer wall of the tube 6. As the pressure of the compression washer increases in response to the axial movement of the nut the inside diameter of the seal decreases and works the metal of the tube to form a re-entrant bead 17 in the tube wall, thus providing a secure fluid tight joint between the seal gland and the tube. An important function of the compression washer 13 is that it prevents the transmission of the turning movement of the nut 14 to seal 16. The shoulder 15 serves to bottom the gland nut 14 at a point which prevents excessive pressure on the seal gland and the tube.

An alternative manner of assembling my tube fitting is to insert the tube 6 through the gland nut 14 until it extends the desired length beyond the gland nut and then to slip over the tube first the washer 13, then the seal gland 16 and to insert this entire assembly into the fitting 8 as above described.

Figure 4:
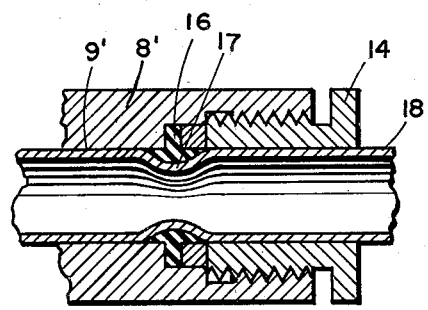
Fig. 4 is a cross sectional view of a modified form showing my fitting subsequent to application of beading pressure.
Figure 5:
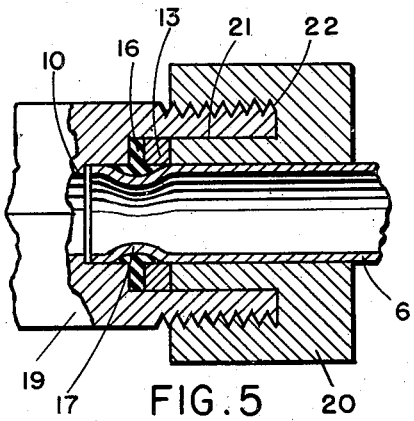
Fig. 5 shows a modification of my invention in which the fitting is exteriorly threaded.
Figure 6:
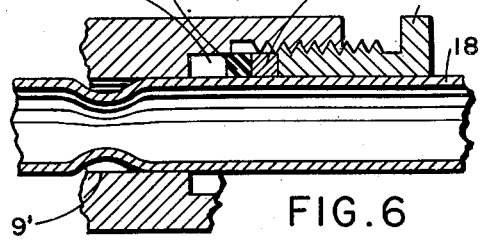
Fig. 6 is a view similar to Fig. 4 showing the modification wherein the tube may be advanced through the fitting.

In Figures 4 and 6 I have shown a modified form of my invention wherein a tube 18 is inserted into a fitting 8' in which the bore 9' is unobstructed so as to permit free passage of the tube. This permits use of my invention where it is necessary to fit a piece of tube between two fixed fittings, in which case it may be desirable to slide the tube 18 through one fitting 8' (see Fig. 6) until the free end of the tube may be inserted into the bore of the other fitting (not shown). This is possible with my invention even though a connection has already been formed between the tube 18 and fitting 8' (see Fig. 4), since it is only necessary to unscrew the gland nut 14, thereby relieving the pressure on the seal 16. The tube 18 will then be free for sliding movement within the bore 9' (Fig. 6). In Figure 5 I have shown a modification of my invention in which the fitting 19 is exteriorly threaded and the gland nut 20 is adapted to cooperate with it. In this modification of my invention the socket 21 remains at a constant width, but the principle of my invention is unchanged. The bottoming of the gland nut 20 at the desired point is assured by the relation of the end 22 of the fitting and the gland nut 20.

It will be appreciated that according to my invention I may vary the depth of the bead 17 formed in the tube by changing the axial extent of the washer 13 or the ring 16. For instance, increasing the thickness or axial extent of the washer 13 and leaving the other parts proportioned as shown will increase the depth of the re-entrant bead. Similarly, increasing the axial extent or thickness of the seal ring 16 will increase the depth of the re-entrant bead. Those skilled in the art will understand that the character of the material of the ring may vary within limits depending upon the tube material, its size, wall thickness and the use to which the fitting is adapted. For instance, a synthetic rubber ring having a durometer hardness of 55 to 75 is well suited for use with aircraft aluminum tube lines between ¼ and ¾ inch outside diameter. Higher durometer values may be preferred for steel or the like.

In this manner I am able to effect a seal and lock on a conventional cylindrical tube without being required to perform a tube flaring operation, which is the present standard method of accomplishing the rigid tube connection. I am also able to eliminate the disadvantages attendant upon use of a metal chuck or a friction contact in forming a fitting.

I claim:

A coupling to secure a tube comprising, in combination, a fitting body having an axial bore adapted to receive a tube, said fitting body being formed at one end with a cylindrical socket having a flat seat normal to the bore, larger than but co-axial with said bore, a sealing ring of constant volume deformable material adapted to be positioned inside said socket, a non-deformable washer having a maximum diameter corresponding to the maximum diameter of the ring and adapted to fit against said sealing ring within said socket, and means to apply a fixed predetermined amount of axial pressure to said washer and ring to force the material of the ring and tube inwardly to lock and seal the tube with respect to the fitting.

CHARLES E. HOLLYDAY, Jr.

REFERENCES CITED

The following references are of record in the file of this patent:

UNITED STATES PATENTS

| Number | Name | Date |
|---|---|---|
| 784,416 | McDonald | Mar. 7, 1905 |
| 2,239,252 | Sander | Apr. 22, 1941 |
| 2,316,806 | Evarts | Apr. 20, 1943 |

FOREIGN PATENTS

| Number | Country | Date |
|---|---|---|
| 701,978 | Germany | Jan. 2, 1941 |
| 482,469 | France | Dec. 30, 1916 |
| 557,812 | France | May 12, 1923 |